United States Patent [19]
Taylor

[11] Patent Number: 5,265,368
[45] Date of Patent: Nov. 30, 1993

[54] FISHING LURE

[76] Inventor: John B. Taylor, 3364 Townsend, Dallas, Tex. 75229

[21] Appl. No.: 972,266

[22] Filed: Nov. 5, 1992

[51] Int. Cl.⁵ ............................................. A01K 85/00
[52] U.S. Cl. ................... 43/42.06; 43/42.22; 43/43.16
[58] Field of Search .............. 43/42.06, 42.22, 42.24, 43/42.35, 44.99, 43.16

[56] References Cited

U.S. PATENT DOCUMENTS

| | | | |
|---|---|---|---|
| 859,045 | 7/1907 | Burke | 43/43.4 |
| 2,445,523 | 7/1948 | Goldbach | 43/42.06 |
| 2,556,702 | 6/1951 | Nielsen | 43/42.06 |
| 2,599,684 | 6/1952 | Bakken | 43/43.4 |
| 2,665,512 | 1/1954 | Sullivan et al. | 43/42.06 |
| 2,691,841 | 10/1954 | Daniel | 43/42.06 |
| 2,871,609 | 2/1959 | Noches | 43/42.06 |
| 2,968,113 | 1/1961 | Multanen | 43/42.06 |
| 3,309,811 | 3/1967 | Wimer | 43/42.06 |
| 3,357,124 | 12/1967 | Stepacoff et al. | 43/42.22 |
| 3,497,988 | 3/1970 | Childers | 43/43.4 |
| 3,585,749 | 6/1971 | Dieckmann | 43/42.06 |
| 3,624,690 | 11/1971 | Ashley | 43/43.16 |
| 3,626,628 | 12/1971 | Weimer | 43/42.06 |
| 3,849,928 | 11/1974 | Collins, Sr. | 43/43.4 |
| 4,433,503 | 2/1984 | Schleif | 43/43.4 |
| 4,438,583 | 3/1984 | Sullivan | 43/42.06 |
| 4,676,020 | 6/1987 | Taylor et al. | 43/42.06 |
| 4,835,897 | 6/1989 | Rudolph | 43/42.06 |
| 4,858,371 | 8/1989 | Preiser | 43/43.16 |

Primary Examiner—Mark Rosenbaum
Assistant Examiner—Chuck Y. Mah
Attorney, Agent, or Firm—Daniel V. Thompson

[57] ABSTRACT

An improved fishing lure is provided having the capability of simulating various live bait movements. In one embodiment, the lure includes a generally hollow lure body, a first port for admitting fluid into the lure body, a second port for allowing fluid to escape from the lure body and a valve located in the lure body which is moveable to a first position at which the first port is open and the second port is closed in response to a pulling force exerted on the lure by a fisherman, whereby water is allowed to enter the lure body through the first port and is inhibited from escaping from the lure body through the second port. The valve is moveable to a second position at which the first port is closed and second port is open in response to the absence of the pulling force, whereby fluid is allowed to escape from the lure body through the second port, but is inhibited from escaping through the first port. In another embodiment, the lure includes first and second valve members which are operable for closing both the first and second ports to retain water within the lure body after a first pulling force is exerted on the lure to retain water within the lure body and before a second pulling force is exerted. Water escapes from the lure body in response to the second pulling force.

12 Claims, 5 Drawing Sheets

FISHING LURE

FIELD OF THE INVENTION

This invention relates generally to fishing lures and more particularly to a fishing lure having the capability of simulating various live bait movements.

1. Background of the Invention

Fishing lures are typically attached to a fishing line and pulled through the water by a fisherman. Lures which simulate live bait have been used for many years and are available in various sizes and shapes. Many fishermen prefer lures instead of live bait for various reasons, including ease of handling and the economic advantages of not having to purchase or capture live bait.

Fishing lures comprise essentially two components, namely some sort of fish-hooking component or mechanism and some sort of body member which serves the plural functions of carrying the fish-hooking component, providing a weight by which the fish-hooking component may be propelled, providing the connection between the fish-hooking component and the fishing line, and providing an appealing attraction which hopefully will entice a fish to strike the lure and thereby be caught.

2. Description of the Prior Art

It is known in the art to provide fishing lures which simulate the movement of various types of live bait. Typically, such lures must be pulled through the water by the fisherman at a relatively high speed in order to simulate the movement of live bait. Further, the simulated movement is usually limited to one particular type of movement. For example, a shrimp tail lure typically has a lead weight in the head portion, so that when the lure falls headfirst the tail flutters, simulating a dying or injured shrimp. Other types of lures simulate the color or shape of various types of live bait. Still other types of lures emit sounds which ostensibly attract fish.

DISCLOSURE OF THE INVENTION

In accordance with the present invention, an improved fishing lure is provided, having the capacity to simulate various live bait movements. The lure is comprised of a generally hollow lure body, first port means for admitting fluid into the lure body, second port means for allowing fluid to escape from the lure body and fluid flow regulating means for regulating the flow of fluid through the first and second port means. The fluid flow regulating means allows fluid to enter the lure body through the first port means and inhibits the escape of fluid from the lure body through the second port means in response to a first predetermined condition. The fluid flow regulating means allows fluid to escape from the lure body through the second port means and inhibits fluid from escaping from the lure body through the first port means in response to a second predetermined condition.

In accordance with a unique feature of the invention, the fluid flow regulating means includes resilient means located in a tail portion of the lure body. The resilient means is expandable in response to the first predetermined condition for admitting fluid into the tail portion and is contractible in response to the second predetermined condition to expel fluid from the tail portion. The fluid flow regulating means further includes valve means mounted in a head portion of the lure body. The valve means is moveable to a first position at which the first port means is open and the second port means is closed to allow fluid to enter the lure body through the first port means and inhibit fluid from escaping from the lure body through the second port means in response to the first predetermined condition. The valve means is moveable to a second position at which the first port means is closed and the second port means is open to inhibit fluid from escaping from the lure body through the first port means and to allow fluid to escape from the lure body through the second port means in response to the second predetermined condition.

In accordance with another unique feature of the invention, hook means is coupled to an exterior surface of the lure body proximate to the second port means. Fluid escaping from the lure body through the second port means directs a fluid flow across at least a portion of the hook means.

In accordance with yet another unique feature of the invention, the hook means includes a generally tubular member with a shank portion and a bent portion, and a hook member, slidably received within the tubular member with opposed ends of the hook member protruding from respective opposed ends of the tubular member. The bent portion has an opening communicating with an interior of the bent portion. The hook member has a barb pivotally mounted thereon. The barb is releasable so that the barb protrudes through the opening in response to movement of the hook member with respect to the tubular member in a first direction and is retractable so that the barb is retained within the tubular member and does not protrude through the opening in response to movement of the hook member with respect to the tubular member in a second direction, opposite from the first direction.

In one embodiment of the invention, the valve means is moveable to the first position at which the first port means is open and the second port means is closed in response to a pulling force being exerted on the lure by a fisherman, whereby fluid is allowed to enter the lure body through the first port and is inhibited from escaping from the lure body through the second port means. The valve means is moveable to the second position at which the first port means is closed and the second port means is open in response to the absence of the pulling force, whereby fluid is allowed to escape from the lure body through the second port means and is inhibited from escaping from the lure body through the first port means. The resilient means is expandable by fluid entering the tail portion of the lure in response to the pulling force and is contractible to expel fluid from the tail portion in the absence of the pulling force. The valve means is moveable to the second position by fluid expelled from the tail portion by the contraction of the resilient means.

In accordance with another aspect of the invention, the fluid flow regulating means is operable for retaining fluid within the lure body in response to a third predetermined condition occurring between the first and second predetermined conditions. In one embodiment, the fluid flow regulating means includes first and second valve members. The first valve member is moveable to a first position at which the first port means is open and the second port means is closed by the first valve member in response to the first predetermined condition, to allow fluid to enter the lure body through the first port means and to inhibit fluid from escaping from the lure body through the second port means. The first valve member is moveable to a second position at which the first port means is closed by the first valve member in response to the third predetermined condition, to inhibit fluid from escaping from the lure body through the first port means.

The second valve member is moveable to a third position at which the second port means is closed by the second valve member in response to the third predetermined condition, to inhibit fluid from escaping from the lure body through the second port means. Fluid is thereby retained in the lure body in response to the third predetermined condition. The second valve member is moveable to a fourth position at which the second port means is open in response to the second predetermined condition, to allow fluid to escape from the lure body through the second port means. The first valve member is maintained in the second position in response to the second predetermined condition to inhibit fluid from escaping from the lure body through the first port means.

The resilient means is expandable in response to the first predetermined condition for admitting fluid into the tail portion and is maintained in an expanded state in response to the third predetermined condition. The resilient means is contractible in response to the second predetermined condition to expel fluid from the tail portion. The second valve member is moveable to the fourth position by the expulsion of fluid from the tail portion to open the second port means and allow fluid to escape from the lure body though the second port means.

In the preferred embodiment, the first predetermined condition corresponds to a first pulling force being exerted on the lure by a fisherman. The first pulling force has the effect of moving the first valve member to the first position, whereby the first port means is open and the second port means is closed, to admit fluid into the lure body. The second predetermined condition corresponds to a second pulling force being exerted on the lure by the fisherman, whereby the second valve member is moveable to the fourth position to open the second port means. The first valve means is maintained in the second position to maintain the first port means in a closed position in response to the second pulling force, so that fluid escapes from the lure body through the second port means, but is inhibited from escaping through the first port means. The third predetermined condition corresponds to the absence of a pulling force on the lure, intermediate the first and second pulling forces, whereby fluid pressure in the lure body moves the first valve member to the second position to close the first port means. In response to the second predetermined condition, the second valve member is in the third position to close the second port means, so that fluid is retained in the lure body.

The fishing lure according to the present invention has the capability of simulating various movements of selected live bait, such as a shrimp or crayfish. For example, in accordance with one embodiment of the invention described above, fluid is allowed to enter the lure body in response to a first pulling force exerted by the fisherman on the lure. The incoming fluid expands the tail portion of the lure, thereby simulating a defensive movement of a shrimp or crayfish. When the first pulling force is discontinued, the access and egress ports of the lure are shut, thereby trapping fluid within the lure body. The fluid remains within the lure body until the fisherman exerts a second pulling force on the lure, thereby causing fluid to escape therefrom in a direction which results in a reactive force on the lure. The reactive force moves the lure upwardly in a movement simulating the escape of shrimp or crayfish from the bottom when the shrimp or crayfish is disturbed. This "escape" movement entices a fish to strike the "escaping" lure.

DETAILED DESCRIPTION OF THE PREFERRED EMBODIMENT

Figure 1:
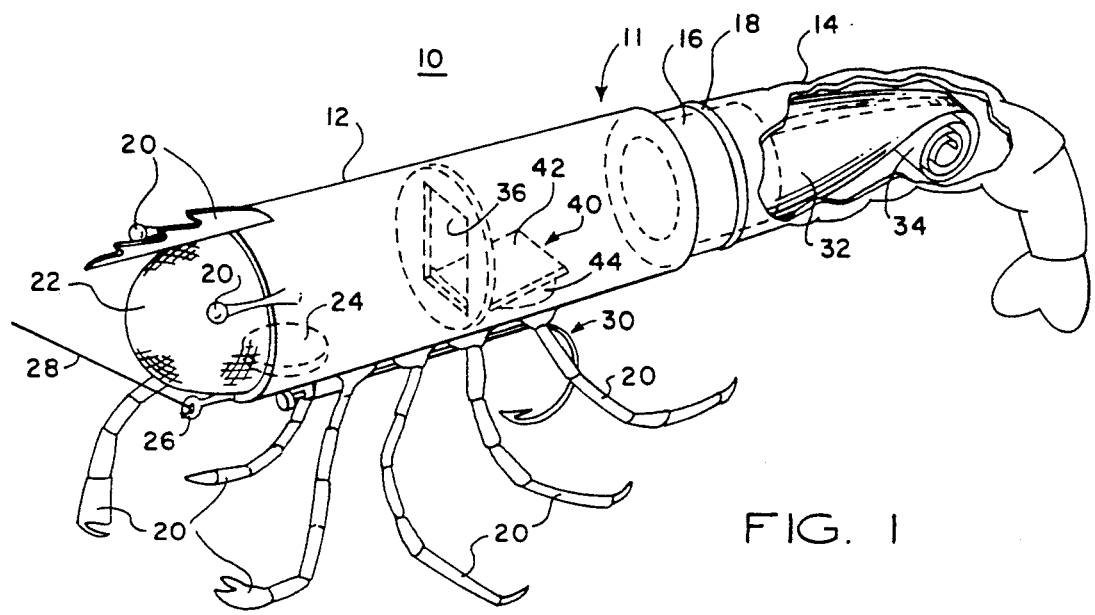
FIG. 1 is a perspective view of a fishing lure simulating the appearance of a shrimp, according to the present invention.

In the description which follows, like parts are marked throughout the specification and drawings with the same respective reference numerals. The drawings are not necessarily to scale and in some instances proportions may have been exaggerated in order to more clearly depict certain features of the invention.

Figure 2:
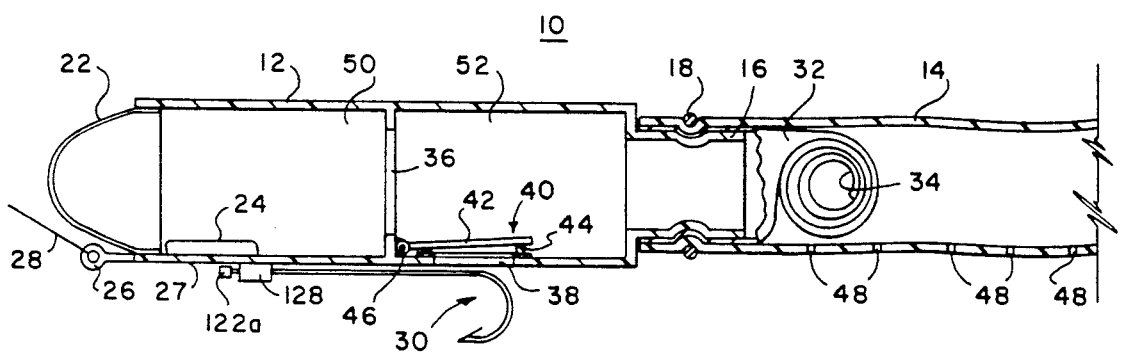
FIG. 2 is a side elevation view of the fishing lure of FIG. 1, showing a resilient member in a coiled position within the tail portion of the lure.

Referring to FIGS. 1 and 2, fishing lure 10 includes an elongated, generally hollow body 11 having a head portion 12 and a tail portion 14. Head portion 12 is preferably made of a relatively hard plastic material, while tail portion 14 is preferably made of a pliable plastic material to allow tail portion 14 to flex. Lure 10 is configured to simulate the appearance of a shrimp or other crustacean. A coupling sleeve 16 is positioned intermediate head portion 12 and tail portion 14. One end of coupling sleeve 16 is inserted into the trailing end of head portion 12 and the opposite end of coupling sleeve 16 is inserted into the leading end of tail portion 14. A snap ring 18 is positioned in concentric relationship about tail portion 14 and sleeve 16 when sleeve 16 is inserted into tail portion 14 for retaining tail portion 14 on sleeve 16. As can be best seen in FIG. 2, sleeve 16 includes a circumferential outer groove for accommodating tail portion 14 in response to radially inward pressure exerted on tail portion 14 by ring 18.

Head portion 12 includes various appendages 20 to simulate the visual appearance of shrimp eyes, legs, etc. The leading end of head portion 12 includes a mesh screen filter 22 for allowing water to flow into the interior of head portion 12 through the front end thereof. The mesh size of filter 22 is selected to substantially inhibit solid material from entering head portion 12, while allowing liquid to flow freely through filter 22 into head portion 12. A weight 24, which is preferably a lead disc, is located in head portion 12 adjacent the leading end thereof. The amount of weight 24 is selected, depending upon whether it is desired that the lure be able to float on or near the surface of a body of water or whether it is desired that the lure fall headfirst when lure 10 is descending in the body of water. Tail portion 14 is configured to flutter when lure 10 falls headfirst, thereby simulating the falling movement of a dying or injured shrimp.

An eyelet 26 is attached to an exterior wall 27 of head portion 12 for receiving a fishing line 28, whereby the movement of lure 10 is controlled by a fisherman manipulating fishing line 28. A hook mechanism, indicated generally at 30, is also attached to exterior wall 27. Hook mechanism 30 will be described in greater detail hereinafter with reference to FIGS. 12-15.

Located inside tail portion 14 is a resilient member comprised of a collapsible bag 32 with a coil spring 34 inside bag 32. Spring 34 is normally in a coiled position with bag 32 substantially collapsed, as shown in FIG. 2.

Located within head portion 12 are first and second ports 36 and 38. Port 36 is substantially rectangular and port 38 is substantially elliptical. As shown in FIG. 2, port 36 is normally open and port 38 is normally closed by a pivotally mounted valve, indicated generally at 40. Valve 40 is a flapper type valve with a relatively flat rectangular member 42 and an elliptical member 44 projecting from a lower surface of rectangular portion 42. Member 44 is truncated at an angle, so that when valve 40 is in the position shown in FIG. 2 for closing port 38, member 42 is inclined upwardly. In FIG. 2, first port 36 is open and second port 38 is closed by member 44. Member 42 is mounted for pivotal movement about pivot axis 46.

As can be best seen in FIG. 2, tail 14 includes a plurality of openings 48 communicating with the interior of tail portion 14. The movement of bag 32 and spring 34 within tail portion 14 forces material, such as a fish attracting scent, located inside tail portion 14, but external to bag 32, through openings 48 into the surrounding water.

Figure 3:
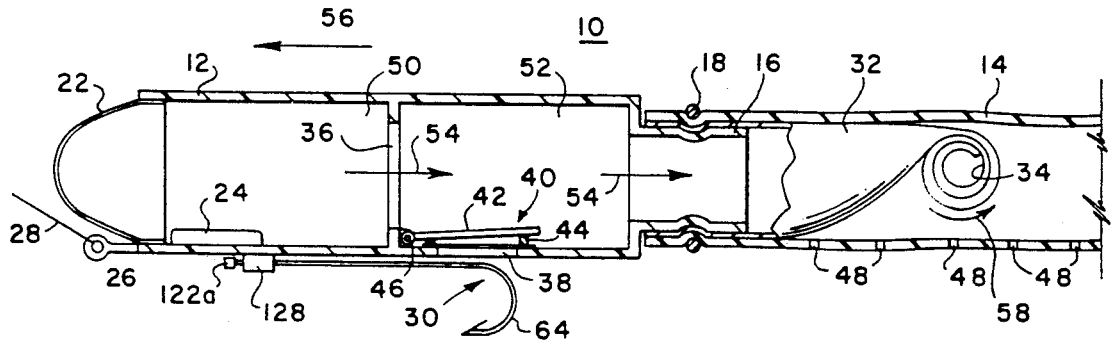
FIG. 3 is a side elevation view of the fishing lure of FIG. 1, depicting the uncoiling of the resilient member by fluid entering the lure in response to a pulling force being exerted on the lure.
Figure 4:
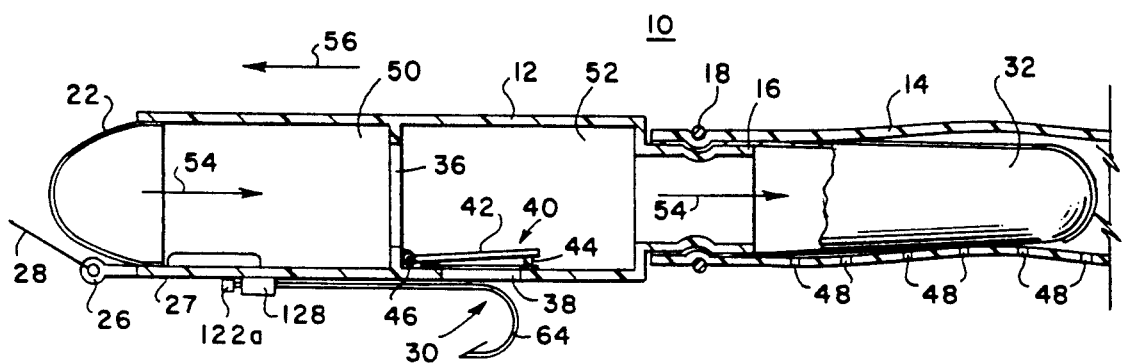
FIG. 4 is a side elevation view of the lure of FIG. 1, showing the resilient member in a fully extended or uncoiled position.
Figure 5:
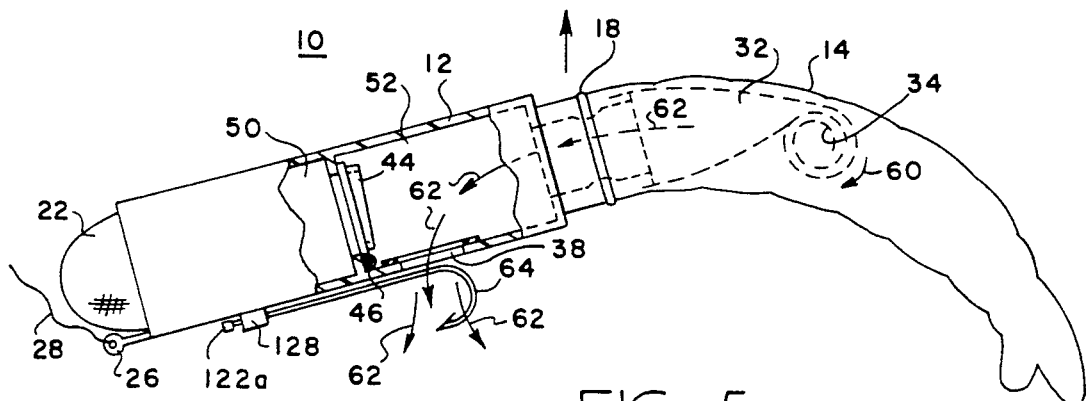
FIG. 5 is a side elevation view of the fishing lure of FIG. 1, depicting the upward movement of the lure in reaction to a downwardly directed force caused by the escape of fluid from the lure.
Figure 6:
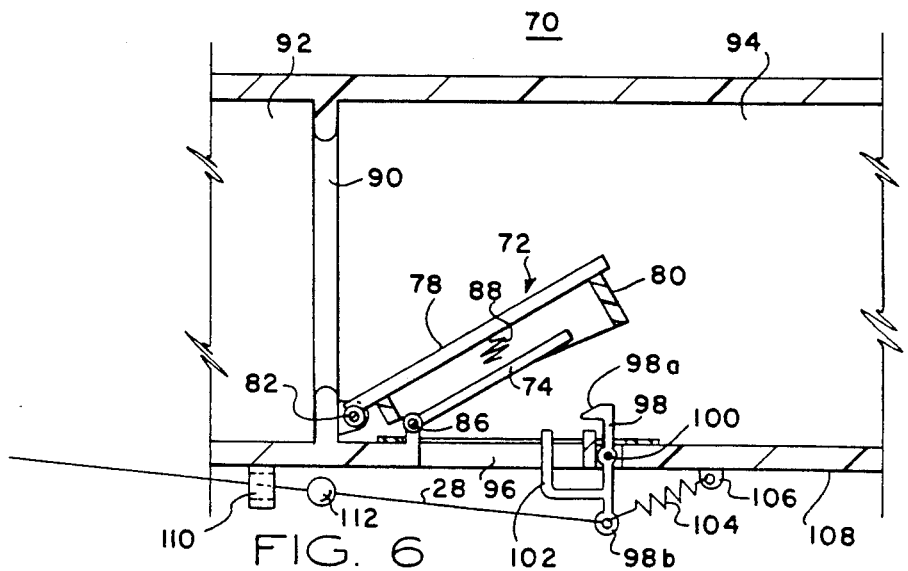
FIG. 6 is a partial side elevation view of an alternate embodiment of a fishing lure, according to the present invention, showing a flow regulating valve within the lure.

Referring now to FIGS. 3-5, a cycle is depicted in which lure 10 is able to simulate various movements of a live shrimp. The cycle is initiated by the fisherman exerting a pulling force (preferably a hard and rapid jerk) on lure 10. The pulling action forces water into head portion 12 through front filter 22. Port 36 divides the interior of head portion 12 into front and rear chambers 50 and 52. When port 36 is open, as shown in FIG. 3, water flows therethrough into chamber 52 and into sleeve 16, as indicated by arrows 54. The direction of the pulling force is indicated by arrow 56. Chamber 52 is in fluid communication with the interior of bag 32 through sleeve 16. The water flow into bag 32 causes bag 32 to expand and spring 34 to uncoil in the direction indicated by arrow 58. The force of the incoming water is sufficient to overcome the bias of spring 34, which tends to maintain spring 34 in the coiled position shown in FIG. 2. By expanding bag 32 and uncoiling spring 34, energy is stored within bag 32. The water flowing through first port 36 into rear chamber 52 also acts on an upper surface of rectangular member 42, thereby maintaining valve 40 in a first position as shown in FIG. 3, for closing second port 38 to prevent the escape of water therethrough. In FIG. 4, bag 32 is shown in a fully extended position by the force of the water entering bag 32, while lure 10 is subjected to the pulling force in the direction indicated by arrow 56.

When the pulling force ceases, water is no longer forced into head portion 12. The biasing force of spring 34 is therefore able to overcome the fluid pressure within bag 32, such that spring 34 is recoiled in the direction indicated by arrow 60, as shown in FIG. 5. The recoiling of spring 34 also collapses bag 32, thereby expelling water from bag 32 as bag 32 collapses. Arrows 62 depict the flow of water expelled from bag 32. The water expelled from bag 32 when bag 32 is collapsed by the action of spring 34 acts on the lower surface of member 42, to pivot the valve 40 upwardly to a second position, as shown in FIG. 5. In the second position, the upper surface of member 42 substantially closes the rectangular port 36 to inhibit the escape of water from lure 10 through port 36. Instead, water is allowed to escape from lure 10 through port 38, as indicated by arrows 62 in FIG. 5.

Port 38 is located proximate to bent portion 64 of hook mechanism 30 so that the water escaping through second port 38 provides a flow of water across bent portion 64 to remove weeds and other debris which may have been picked up by bent portion 64 as lure 10 is moved through the water. In effect, the water escaping through port 38 helps render hook mechanism 30 substantially weedless. The recoiling action of spring 34 forces water through second port 38 at sufficient velocity to provide a reaction force on lure 10 in the direction of arrow 66, thereby resulting in a rapid upward movement of lure 10. The reaction force acting in the direction of arrow 66 also causes tail portion 14 to flex, such that lure 10 assumes a U-shape as shown in FIG. 5, which simulates not only the movement, but also the appearance of a shrimp escaping upwardly in response to a disturbance. The upward movement of lure 10 dislodges any weeds collected on the body of lure 10 just as a live shrimp is able to dislodge weeds by its upward "escape" movement. The upward movement of lure 10, simulating an escaping shrimp, is likely to entice a fish strike.

In accordance with the above-described cycle, lure 10 is operable for simulating two distinct movements of a shrimp which have not heretofore been available with prior art fishing lures. The initial jerking action on lure 10 causes water to enter lure 10 and expand tail portion 14, which simulates a defensive movement of the shrimp. The subsequent expulsion of water from lure 10 causes lure 10 to move rapidly upward, which simulates an escape movement of the shrimp. Further, weight 24 located in head portion 12 provides a headfirst descent of lure 10 when lure 10 is allowed to "free fall". During the headfirst descent, tail portion 14 flutters to simulate a dying or injured shrimp. Therefore, three distinct movements of a shrimp or other crustacean can be simulated using lure 10 instead of just the "free fall" movement associated with prior art shrimp tails.

Figure 7:
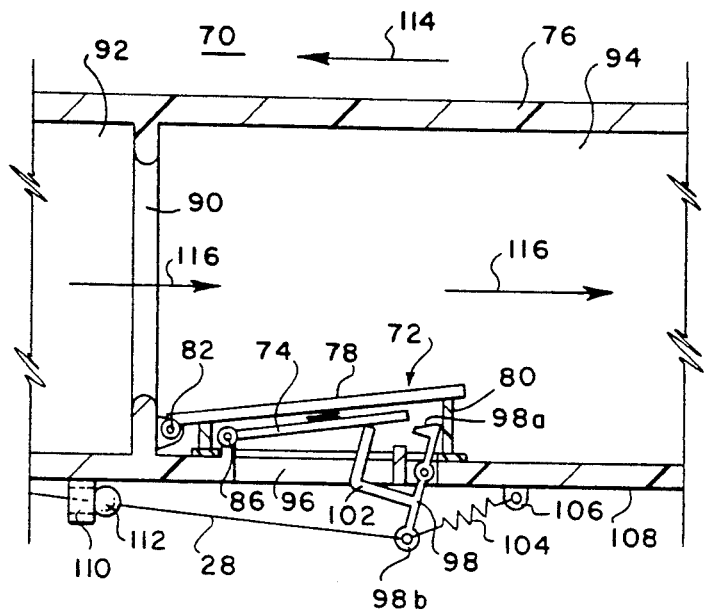
FIGS. 7 and 8 are respective partial side elevation views of the fishing lure of FIG. 6, depicting the operation of the flow regulating valve in response to fluid entering the lure.
Figure 8:
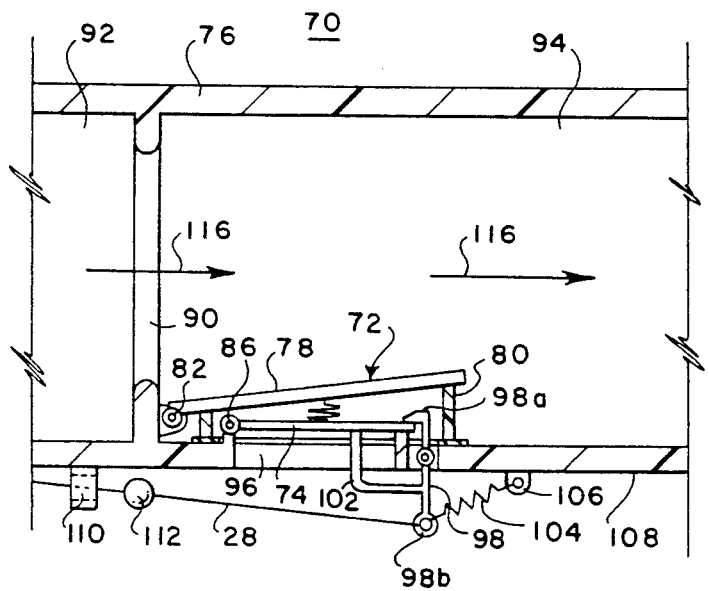
Figure 9:
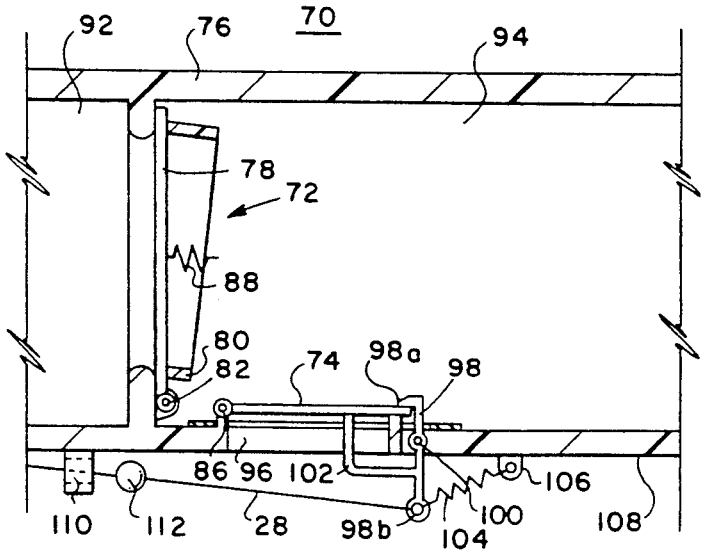
FIG. 9 is a partial side elevation view of the fishing lure of FIG. 6, depicting the operation of the flow regulating valve to retain fluid within the lure.

Referring to FIGS. 6–11, an alternate embodiment of a fishing lure 70, according to the present invention, is depicted. Lure 70 is configured substantially the same as lure 10, described above with reference to FIGS. 1–5, except that lure 70 includes first and second valves 72 and 74, respectively, which are pivotally mounted within head portion 76 of lure 70. First valve 72 is comprised of a relatively flat rectangular member 78 and a generally elliptical member 80 projecting from a lower surface of rectangular member 78. Elliptical member 80 is truncated at an angle so that when first valve 72 is positioned as shown in FIGS. 7 and 8, rectangular member 78 is inclined slightly upwardly. Rectangular member 78 is mounted for pivotal movement about a pivot axis 82. Second valve 74 is comprised of a relatively flat rectangular member, which is mounted for pivotal movement about pivot axis 86. A spring 88 is carried on a lower surface of rectangular member 78 for preventing direct contact between valves 72 and 74. Both first and second valves 72 and 74 are flapper type valves.

Head portion 76 includes a substantially rectangular first port 90, which divides the interior of head portion 76 into front and rear chambers 92 and 94. Water is able to freely enter front chamber 92 through a mesh screen filter (not shown) at the front end of head portion 76. First valve 72 regulates the flow of water through port 90 into rear chamber 94, as will be described in greater detail hereinafter. A second port 96 is provided for allowing water to escape from lure 70. Both first and second valves 72 and 74 are used to regulate the flow of water through port 96, as will be described in greater detail hereinafter.

Lure 70 is further equipped with a latch member 98, which is mounted for pivotal movement about a pivot axis 100. An L-shaped lifting arm 102 is mounted for co-movement with latch member 98. One end 98a of latch member 98 is located in second chamber 94, while the opposite end 98b thereof is exterior to second chamber 94. Second end 98b includes an eyelet adapted to receive fishing line 28, whereby line 28 is attached to lure 70. A tension spring 104 is mounted between ends 98b and a nub 106 projecting from an exterior wall 108 of head portion 76. A stop member 110 projects from exterior wall 108 and a spherical bead 112 is carried on fishing line 28 between stop member 110 and end 98b. As can be best seen in FIG. 7, the engagement between bead 112 and stop member 110 limits the pivoting movement of latch member 98.

Referring now to FIGS. 7–11, a cycle is depicted, whereby lure 70 is operable for simulating various movements of a live shrimp. When a first pulling force is exerted on fishing line 28 in the direction of arrow 114 in FIG. 7, water is forced into head portion 76 in the direction of arrows 116. Water flows from front chamber 92 through port 90 into rear chamber 94 and thence into the collapsible bag in the tail portion (not shown) of lure 70, thereby extending the tail portion of lure 70 to simulate a defensive movement of a shrimp.

The incoming water flow acting on the upper surface of rectangular member 78 pivots first valve 72 downwardly to a first position, as shown in FIG. 7. When first valve 72 is in the first position, elliptical member 80 covers port 96 to inhibit water from escaping from lure 70 through port 96.

The downward pivoting movement of first valve 72 also pivots second valve 74 downwardly to the position shown in FIG. 7. When the first pulling force is exerted on fishing line 28, latch member 98 is pivoted as shown in FIG. 7, with the pivoting movement being limited by the engagement between stop member 110 and bead 112. When latch member 98 is pivoted as shown in FIG. 7, arm 102 exerts a lifting force on second valve 74 to position second valve 74 at a slightly open position, as shown in FIG. 7. The lifting force exerted on second valve 74 by arm 102 compresses spring 88 between members 78 and 84.

When the pulling force on fishing line 28 ceases, spring 104 returns latch member 98 to a substantially vertical position, as shown in FIG. 8. This movement of latch member 98 also lowers arm 102, to allow second valve 74 to pivot downwardly to a substantially horizontal position. End 98a engages the relatively flat top surface of second valve 74 to retain second valve 74 in the substantially horizontal position shown in FIG. 8. This position corresponds to a closed position of second valve 74 to inhibit the escape of water through port 96.

When the pulling force on fishing line 28 ceases, water will cease to flow into lure 70 in the direction of arrows 116. When this condition occurs, the tail portion of the lure will begin to recoil, thereby forcing water back into chamber 94. The backflow of water into chamber 94 acts on the lower surface of rectangular member 78, thereby pivoting first valve 72 upwardly to the position shown in FIG. 9, wherein rectangular member 78 closes port 90 to prevent the escape of water from the tail portion of lure 70 and from chamber 94 through port 90. In this condition, port 90 is closed by first valve 72 and port 96 is closed by second valve 74. Fluid is thereby retained within lure 70 until the fisherman decides to initiate the "escape" movement by exerting a second pulling force on line 28. As such, energy is effectively stored within lure 70, to be released at will by the fisherman.

Figure 10:
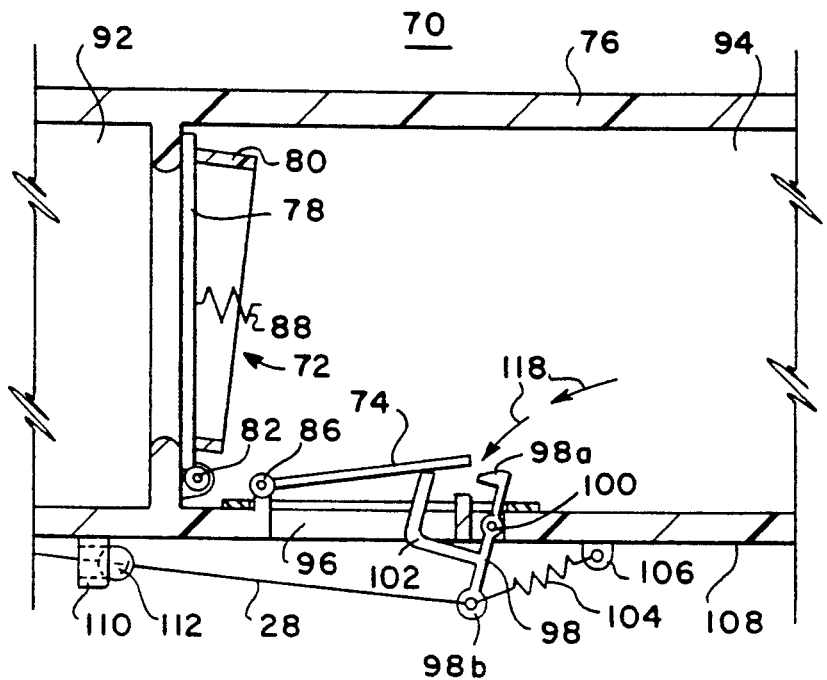
FIGS. 10 and 11 are partial side elevation views of the fishing lure of FIG. 6, depicting the operation of the flow regulating valve to allow fluid to escape from the lure.
Figure 11:
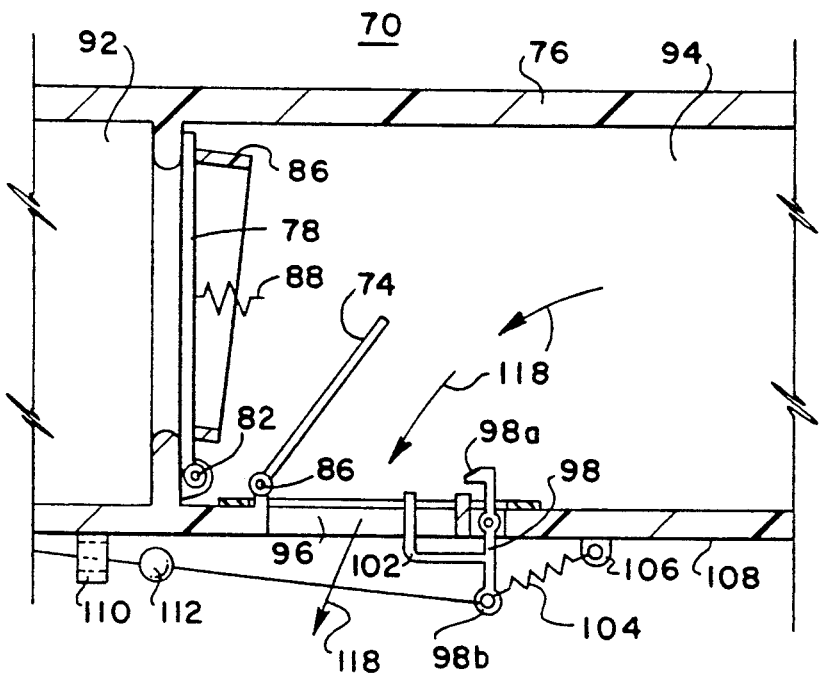
Figure 12:
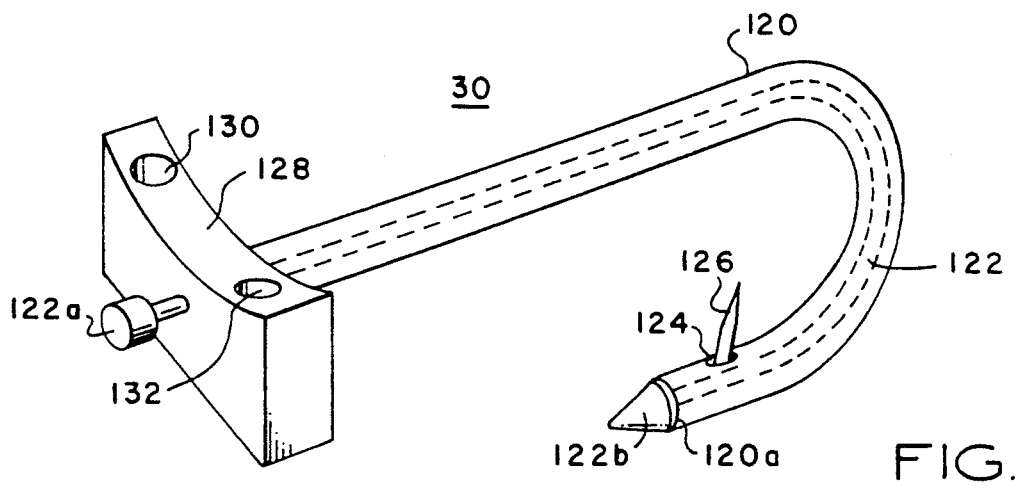
FIG. 12 is a perspective view of a quick release hook mechanism, according to the present invention.

Referring specifically to FIGS. 10 and 11, when the fisherman decides to initiate the "escape" movement, he exerts a second pulling force on line 28 to pivot latch member 98, as shown in FIG. 10. When latch member 98 is so pivoted, arm 102 lifts second valve 74 upwardly to move second valve 74 to an open position for allowing water to escape from chamber 94 through port 96, as indicated by arrows 118. The flow of water acting on the relatively flat lower surface of second valve 74 pivots second valve 74 to a fully open position, as shown in FIG. 11. The rapid release of pressure caused by the recoiling of the spring within the tail portion of lure 70 provides a relatively rapid outflow of water from chamber 94 through port 96, which results in a reaction force to move lure 70 in a direction opposite from the direction of outflow through port 96. The movement of lure 70 in response to the reaction force causes lure 70 to assume a U-shape, similar to that shown in FIG. 5 with respect to lure 10, thereby simulating the "escape" movement of a shrimp. Although not shown in FIGS. 6–11, the bent portion of the hook mechanism associated with lure 70 is located proximate to port 96, so that the rapid outflow of water from chamber 94 provides a flow across the bent portion of the hook to remove weeds and other debris picked up by the hook, thereby rendering the hook essentially weedless. The pressure in chamber 94 acting on the lower surface of rectangular member 78 maintains first valve 72 in the position shown in FIG. 11 for closing port 90, whereby fluid is inhibited from escaping through port 90, but is allowed to escape through port 96.

In accordance with the cycle described in FIGS. 7-11, lure 70 is operable for simulating the same distinct movements described above with reference to FIGS. 1-5. Lure 70 has the capability of storing energy in the form of fluid pressure so that the fisherman can decide when to initiate the "escape" movement. By way of contrast, the "escape" movement is initiated automatically in lure 10 upon the cessation of the pulling force. Lure 70 provides added versatility because the fisherman can decide when to initiate the "escape" movement. For example, the fisherman can let lure 70 settle on the bottom of a body of water before initiating the "escape" movement.

Figure 13:
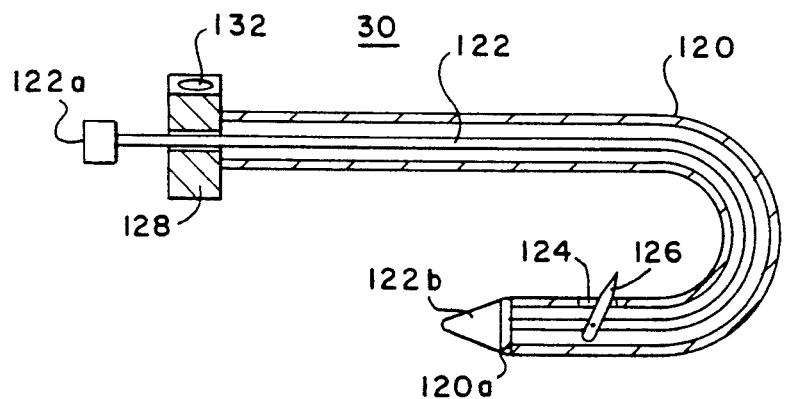
FIGS. 13 and 14 are respective longitudinal sectional views of the hook mechanism of FIG. 12, depicting a hook barb in extended and retracted positions, respectively.
Figure 14:
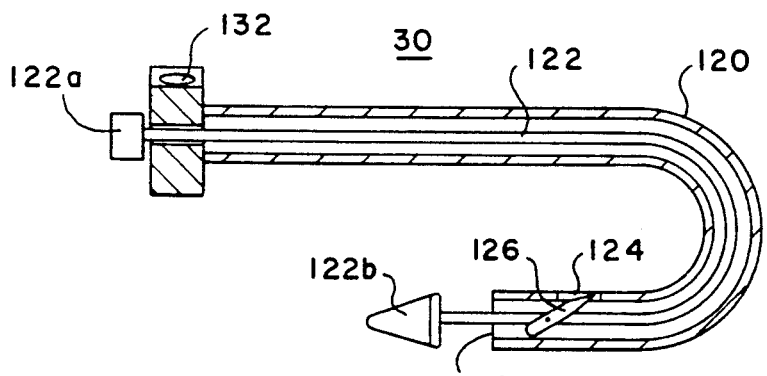

Referring to FIGS. 12-15, hook mechanism 30 is comprised of a generally tubular member 120 and a hook member 122 slidably received within tubular member 120, with opposed ends of hook member 122 protruding from respective opposed ends of tubular member 120. Tubular member 120 and hook member 122 each include a relatively straight shank portion and a bent portion. The bent portion of tubular member 120 has an opening 124 communicating with the interior of tubular member 120. Hook member 122 has a relatively sharp barb 126 pivotally mounted thereon. Barb 126 is releasable so that it protrudes through opening 124 in response to movement of hook member 122 in a first direction with respect to tubular member 120 such that end 122a of hook member 122 is moved away from a mounting member 128 and opposite end 122b of hook member 122 is moved toward distal end 120a of tubular member 120, as shown in FIG. 13. End 122a is enlarged with respect to the remainder of hook member 122 to provide a relatively flat end surface for accommodating finger pressure thereon. End 122b is tapered to provide a relatively sharp hook end. Pointed end 122b cooperates with barb 126 to capture a fish which strikes the corresponding lure on which hook mechanism 30 is mounted. Barb 126 is releasable from a captured fish by grasping mounting member 128 and applying finger pressure to end 122a to move hook member 122 in a second direction with respect to tubular member 120, opposite from the aforementioned first direction, such that end 122a is moved toward mounting member 128 and end 122b is moved outwardly from end 120a, as shown in FIG. 14. Therefore, the captured fish is releasable with minimal damage to the fish.

In addition to providing a quick release mechanism for releasing hooked fish, hook mechanism 30 also provides a relatively weedless hook. The normal position of barb 126 is as shown in FIG. 14, with barb 126 retained within tubular member 120 so that barb 126 does not protrude through opening 124. In this configuration, barb 126 is not exposed, thereby inhibiting retention of weeds and other debris as hook mechanism 30 is moved through the water. When a fish strikes the lure to which hook mechanism 30 is attached, the striking action pushes end 122b back toward end 120a, thereby releasing barb 126 to protrude through opening 124, as shown in FIG. 13, so that barb 126 cooperates with pointed end 122b to capture the striking fish. The shank portion of tubular member 120 is affixed to mounting member 128. Mounting member 128 has first and second passages 130 and 132 extending transversely therethrough for receiving respective screws or other attachment members to attach hook mechanism 30 to the exterior wall of a lure body. For example, as shown in FIGS. 1-5, hook mechanism 30 is mounted with head portion 12 by attaching mounting member 128 securely to exterior wall 27. Mounting member 128 also provides a suitable grasping surface to facilitate the exertion of finger pressure on end 122a to release a captured fish.

Figure 15:
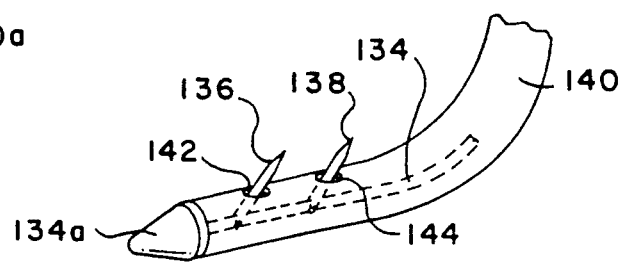
FIG. 15 is a perspective view of a portion of an alternate embodiment of a quick release hook mechanism, according to the present invention, showing the hook mechanism equipped with two barbs.

Referring specifically to FIG. 15, a hook member 134 is used having two barbs 136 and 138. The tubular member 140 in which hook member 134 is slidably received is equipped with two openings 142 and 144 for accommodating the respective barbs 136 and 138. End 134a of hook member 134 is tapered to provide a relatively sharp hook end. End 134a cooperates with barbs 136 and 138 to capture a fish which strikes the lure to which the corresponding hook mechanism is attached.

The preferred embodiment of the invention has now been described in detail. Since it is obvious that many changes in and additions to the above-described preferred embodiment may be made without departing from the nature, spirit and scope of the invention, the invention is not to be limited to the disclosed details, except as set forth in the appended claims.

What is claimed is:

1. A fishing lure, comprising:
 a generally hollow lure body;
 first port means for admitting fluid into said lure body;
 second port means for allowing fluid to escape from said lure body;
 fluid flow regulating means for allowing fluid to enter said lure body through said first port means and for inhibiting the escape of fluid from said lure body through said second port means in response to a first predetermined condition, said fluid flow regulating means being operable to allow fluid to escape from said lure body through said second port means and inhibit fluid from escaping from said lure body through said first port means in response to a second predetermined condition;
 wherein said lure body includes a generally hollow head portion and a generally hollow tail portion coupled to said head portion with said head portion in fluid communication with said tail portion; and
 wherein said fluid flow regulating means includes a resilient member located in said tail portion, said resilient member being expandable in response to said first predetermined condition for admitting fluid into said tail portion and being contractible in response to said second predetermined condition to expel fluid from said tail portion, said fluid flow regulating means further including a valve member mounted in said head portion, said valve member being moveable to a first position at which said first port means is open and said second port means is closed to allow fluid to enter said lure body through said first port means and inhibit fluid from escaping from said lure body through said second port means in response to said first predetermined condition, said valve member being moveable to a second position at which said first port means is closed and said second port means is open to inhibit fluid from escaping from said lure body through said first port means and to allow fluid to escape from said lure body through said second port means in response to said second predetermined condition.

2. The fishing lure of claim 1 further including hook means coupled to an exterior surface of said lure body proximate to said second port means, the escape of fluid from said lure body through said second port means directing a fluid flow across at least a portion of said hook means.

3. A fishing lure, comprising:

a generally tubular lure body having a generally hollow head portion and a generally hollow tail portion coupled to said head portion with said head portion in fluid communication with said tail portion;

first port means for admitting fluid into said lure body;

second port means for allowing fluid to escape from said lure body;

valve means located in said lure body, said valve means being moveable to a first position at which said first port means is open and said second port means is closed in response to a pulling force being exerted on said lure by a fisherman, whereby fluid is allowed to enter said lure body through said first port means and is inhibited from escaping from said lure body through said second port means, said valve means being moveable to a second position at which said first port means is closed and said second port means is open in response to the absence of said pulling force, whereby fluid is allowed to escape from said lure body through said second port means and is inhibited from escaping from said lure body through said first port means; and resilient means located in said tail portion, said resilient means being expandable by fluid entering said tail portion in response to said pulling force and being contractible to expel fluid from said tail portion in the absence of said pulling force, said valve means being moveable to said second position by fluid expelled from said tail portion by the contraction of said resilient means.

4. The fishing lure of claim 3 wherein said valve means is located in said head portion.

5. The fishing lure of claim 4 wherein said first and second port means are located in said head portion.

6. The fishing lure of claim 5 further including hook means coupled to an exterior surface of said head portion proximate to said second port means, the escape of fluid from said head portion through said second port means directing a fluid flow across at least a portion of said hook means.

7. A fishing lure, comprising:

a generally hollow lure body;

first port means for admitting fluid into said lure body;

second port means for allowing fluid to escape from said lure body;

fluid flow regulating means for allowing fluid to enter said lure body through said first port means in response to a first predetermined condition and for allowing fluid to escape from said lure body through said second port means in response to a second predetermined condition, said fluid flow regulating means being operable for retaining fluid within said lure body in response to a third predetermined condition occurring between said first and second predetermined conditions wherein; and said lure body has a head portion and a tail portion coupled to said head portion, said head portion being in fluid communication with said tail portion, said fluid flow regulating means including:

a first valve member located in said lure body, said first valve member being moveable to a first position at which said first port means is open and said second port means is closed by said first valve member in response to said first predetermined condition, to allow fluid to enter said lure body through said first port means and to inhibit fluid from escaping from said lure body through said second port means, said first valve member being moveable to a second position at which said first port means is closed by said first valve member in response to said third predetermined condition, to inhibit fluid from escaping from said lure body through said first port means;

a second valve member located in said lure body, said second valve member being moveable to a third position at which said second port means is closed by said second valve member in response to said third predetermined condition, to inhibit fluid from escaping from said lure body through said second port means, said second valve member being moveable to a fourth position at which said second port means is open in response to said second predetermined condition, to allow fluid to escape from said lure body through said second port means, said first valve member being in said second position in response to said second predetermined condition to inhibit fluid from escaping from said lure body through said first port means; and a resilient member located in said tail portion, said resilient member being expandable in response to said first predetermined condition for admitting fluid into said tail portion, said resilient member being maintained in an expanded state in response to said third predetermined condition, said resilient member being contractible in response to said second predetermined condition to expel fluid from said tail portion, said second valve member being moveable to said fourth position by the expulsion of fluid from said tail potion to open said second port means and allow fluid to escape from said lure body.

8. The fishing lure of claim 7, wherein said first predetermined condition corresponds to a first pulling force being exerted on the lure by a fisherman, said first pulling force having the effect of moving said first valve member to said first position, whereby said first port means is open and said second port means is closed, said second predetermined condition corresponding to a second pulling force being exerted on the lure by the fisherman, whereby said second valve member is moveable to said fourth position to open said second port means, said first valve member being maintained in said second position to close said first port means in response to said second pulling force, said third predetermined condition corresponding to an absence of a pulling force on the lure, intermediate the first and second pulling forces, whereby fluid pressure in said lure body moves said first valve member to said second position to close said first port means, said second valve member being maintained in said third position to close said second port means in response to said third predetermined condition.

9. The fishing lure of claim 8 wherein said first and second valve members are pivotally mounted in said head portion, said lure further including retaining means for retaining said second valve member in said third position, said retaining means including a latch member pivotally mounted with said head portion, said latch member being moveable to a fifth position for allowing said second valve member to be moved to said third position and to be released therefrom and to a sixth position for retaining said second valve member in said third position, said retaining means further including biasing means coupled between said latch member and said head portion for biasing said latch member toward said sixth position.

10. The fishing lure of claim 9 further including releasing means for releasing said latch member to allow said second valve member to be moved to and from said third position, said releasing means including a line attached to said latch member, said latch member being moveable to said fifth position by either said first or second pulling force, said latch member being moveable to said sixth position by said biasing means in the absence of both said first and second pulling force.

11. The fishing lure of claim 10 wherein said releasing means further includes a lifting arm mounted for co-movement with said latch member, said lifting arm acting on an undersurface of said second valve member when said latch member is moved to said sixth position to lift said second valve member at least partially upwardly from said third position, fluid pressure in said head portion acting on said undersurface being sufficient to further lift said second valve member to said fourth position, whereby said second port means is opened to allow liquid to escape from said lure body through said second port means.

12. The fishing lure of claim 11 further including spring means located on said first valve member, said spring means being positionable between said first and second valve members to inhibit direct contact therebetween, said releasing means further including a bead member carried on said line and a stop member on an exterior surface of said head portion, the pivoting movement of said latch member being limited by the engagement between said bead member and said stop member to define said sixth position.

* * * * *